(12) United States Patent
Bastian

(10) Patent No.: US 8,502,058 B2
(45) Date of Patent: *Aug. 6, 2013

(54) SYSTEM AND METHOD FOR CONTROLLING AUDIO EQUIPMENT

(75) Inventor: Mark-Jan Bastian, Amstelveen (NL)

(73) Assignee: N2IT Holding B.V., Schoonhoven (NL)

(*) Notice: Subject to any disclaimer, the term of this patent is extended or adjusted under 35 U.S.C. 154(b) by 0 days.

This patent is subject to a terminal disclaimer.

(21) Appl. No.: 13/544,194

(22) Filed: Jul. 9, 2012

(65) Prior Publication Data

US 2012/0272812 A1 Nov. 1, 2012

Related U.S. Application Data

(60) Continuation of application No. 13/351,112, filed on Jan. 16, 2012, now Pat. No. 8,217,252, which is a continuation of application No. 12/630,323, filed on Dec. 3, 2009, now Pat. No. 8,097,800, which is a continuation of application No. 11/773,195, filed on Jul. 3, 2007, now abandoned, which is a continuation of application No. 11/355,851, filed on Feb. 15, 2006, now Pat. No. 7,238,874, which is a division of application No. 10/133,846, filed on Apr. 26, 2002, now Pat. No. 7,012,184, which is a continuation of application No. PCT/NL01/00055, filed on Jan. 26, 2001.

(30) Foreign Application Priority Data

Feb. 29, 2000 (NL) ..................................... 1014526

(51) Int. Cl.
*G10H 7/00* (2006.01)

(52) U.S. Cl.
USPC .................................................. 84/612; 369/9

(58) Field of Classification Search
USPC .............................. 369/9, 69, 70; 84/612, 645
See application file for complete search history.

(56) References Cited

U.S. PATENT DOCUMENTS

| 3,755,792 | A | 8/1973 | Harvey |
| 4,173,164 | A | 11/1979 | Adachi et al. |
| 4,176,328 | A | 11/1979 | Brown et al. |
| 4,300,225 | A | 11/1981 | Lambl |
| 4,363,048 | A | 12/1982 | Tanaka et al. |

(Continued)

FOREIGN PATENT DOCUMENTS

| EP | 0871173 | 10/1998 |
| WO | WO-97/01168 | 1/1997 |
| WO | WO-01/65559 | 9/2001 |

OTHER PUBLICATIONS

Acquaviva, Giovanni, "Declaration of Giovanni Acquaviva, Managing Director N2IT Holding B.V. (Jun. 14, 2007)", Testimony and Exhibits 1-15 in Support of Motion for Preliminary Injunction, N2IT Holding B.V. v. Native Intruments North America, Inc., Jul. 16, 2007.

(Continued)

*Primary Examiner* — Jeffrey Donels
(74) *Attorney, Agent, or Firm* — Jeffrey D. Myers; Peacock Myers, P.C.; William N. Hughet

(57) ABSTRACT

An apparatus for signal processing, wherein a disc is placed on a turntable and is provided with a groove which can be followed by the pick-up element, and employing a time-code signal wherein during use of the disc the said time-code signal controls the digital audio source.

20 Claims, 3 Drawing Sheets

U.S. PATENT DOCUMENTS

| | | | |
|---|---|---|---|
| 4,901,300 | A | 2/1990 | Van Der Zande et al. |
| 5,185,805 | A | 2/1993 | Chiang |
| 5,297,167 | A | 3/1994 | Buzbee et al. |
| 5,339,301 | A | 8/1994 | Raaymakers et al. |
| 5,345,244 | A | 9/1994 | Gildea et al. |
| 5,350,882 | A | 9/1994 | Koguchi et al. |
| 5,353,275 | A | 10/1994 | Almonte |
| 5,512,704 | A | 4/1996 | Adachi |
| 5,572,201 | A | 11/1996 | Graham et al. |
| 5,862,106 | A | 1/1999 | Washikawa et al. |
| 6,541,690 | B1 | 4/2003 | Segers, Jr. |
| 6,576,825 | B2 | 6/2003 | Yamada et al. |
| 6,818,815 | B2 | 11/2004 | Cohen |
| 7,012,184 | B2 | 3/2006 | Bastian |
| 7,041,892 | B2 | 5/2006 | Becker |
| 7,146,011 | B2 | 12/2006 | Yang et al. |
| 7,184,654 | B2 | 2/2007 | Kanamori et al. |
| 7,235,732 | B2 | 6/2007 | Becker |
| 7,238,874 | B2 | 7/2007 | Bastian |
| 7,615,702 | B2 | 11/2009 | Becker et al. |
| 7,683,249 | B2 | 3/2010 | Becker |
| 2003/0029305 | A1 | 2/2003 | Kent et al. |
| 2003/0185405 | A1 | 10/2003 | Spencer et al. |
| 2005/0081699 | A1 | 4/2005 | Becker |
| 2005/0152236 | A1 | 7/2005 | Wardle |
| 2006/0165392 | A1 | 7/2006 | Kanamori et al. |
| 2008/0063214 | A1 | 3/2008 | Spencer et al. |
| 2009/0116660 | A1 | 5/2009 | Croft et al. |

OTHER PUBLICATIONS

Avenell, Simon, "eDucation: some of the economics of eCommerce and the future of Higher Education", Apple University Consortium e-Xplore 2001, Sep. 23, 2001, 1-1 to 1-11.

Bauer, Chris, "Remixing Reality—the role of new interfaces and the politics of techno-utopianism", MA Digital Arts Thesis, Middlesex University, 1998.

Bauer, Chris, "The Spacedeck Project", spacedeck project website, Nov. 16, 2001.

Blum, Stanton, "Stanton Finalscrtach 2", Remix Magazine, May 1, 2005.

Boswell, Rod, "The Wedge Virtual Reality Theatre", Apple University.Consortium e-Xplore 2001, Sep. 23, 2001, 2-1 to 2-6.

Crean, David, "QuickTime streaming: a gateway to multi-modal social.analyses", Apple University Consortium e-Xplore 2001, Sep. 23, 2001.

Dodds, Alan, "High Tech, High Touch—Education at a Distance", Apple University Consortium e-Xplore 2001, Sep. 23, 2001.

Dunbar, Andrew et al., "JoePM: Implementing a Collaborative Environment for Learning Multimedia Project Management", Apple University Consortium e-Xplore 2001, Sep. 23, 2001, 5-1 to 5-8.

EPO Appeal, "Applicant's Brief for Grounds for Appeal (Jan. 7, 2005)", Filed in EPO Serial No. 01908437.7 on Oct. 6, 2004., Jan. 7, 2005.

EPO Appeal, "Applicant's Response to Technical Board of Appeal Preliminary Opinion", Proceeding regarding EPO Serial No. 01908437.5, Oct. 10, 2005.

EPO Appeal, "EPO Appeal Board Oral Proceedings", EP 1 908437, Nov. 18, 2005.

EPO Appeal, "EPO Appeal Board Decision", EP 1 908 437, Dec. 23, 2005.

EPO Appeal, "EPO Communication Rule 51(6) EPC Allowance following Board Decision", EP 1 908 437, Jan. 25, 2006.

EPO Appeal, "Opposition-Observations by Third Party (Dec. 3, 2003)—Applicant Response (Apr. 9, 2004)", EP 01 908 437.5, Dec. 23, 2005.

EPO Appeal, "Request Reconsideration and Notice of Appeal of EPO Examiner's Refusal to Allow", EP 1-908 437, Aug. 5, 2004.

Final Scratch, , "What is Final Scratch", HTTP://WWW.FINALSCRATCH.com/fs4/load.asp?db=FS_MAC&sub=start.

Finalscratch Club Network, , "Play Digital .. The Analog Way", FinalScratch Club Network web site, www.fianlscratch.com FS-MAC, Sep. 7, 2004.

Gardner, William G. et al., "Spectral Correlation of Modulated Signals: Part II—Digital Modulation", IEEE Transactions on Communications, vol.-COM-35, No. 6, Jun. 6, 1987, 595-601.

Hacker, Scott et al., "FinalScratch", "The BeOS Bible", published by Peachpit Press, Copyright 1999, 1999, 751.

Hogg, Suzanne, "Sound in Educational Presentations the Tantalising, Terrifying, Too-Often-Forgotte Tool", Apple University Consortium e-Xplore 2001, Sep. 23, 2001, 6-1 to 6-6.

Inque, T. et al., "A Disrete Four-Channel Disc and Its Reproducing System (CD-4 System)", Journal of Audio Engineering Society, Mar. 25, 1971, 162-169.

Jackson, Charles, "Declaration of Dr. Charles L. Jackson (Jun. 15, 2007)", Experts Testimony, USDC Central District of California, N2IT Holding B.V. v. Native Intruments North America, Inc., Jul. 16, 2007.

Kemm, Robert E. et al., "Collaborative Learning: on-campus in a Technololgy Based Environment", Apple University Consortium e-Xplore 2001, Sep. 23, 2001, 7-1 to 7-14.

Kirn, Peter, "NI Ends Legal Dispute Over Traktor Scratch; Digital Vinyl's Twisty, Turny History", CreateDigitalMusic.com, Apr. 28, 2008.

Lai, Bing-Chang et al., "Developing a Java API for Digital Video Control Using the Firewire SDK", Apple University Consortium e-Xplore 2001, Sep. 23, 2001, 9-1 to 9-9.

Lai, Bing-Chang et al., "Programming the Velocity Engine", Apple University Consortium e-Xplore 2001, Sep. 23, 2001, 8-1 to 8-14.

Lowe, Richard, "Beyond "eye candy": Improving Learning with Animations", Apple University Consortium e-Xplore 2001, Sep. 23, 2001, 10-1 to 10-9.

Luca, Joe et al., "Designing and On-Line Learning Environment to Support the Development of Generic Skills: a case study", Apple University Consortium e-Xplore 2001, Sep. 23, 2001, 11-1 to 11-8.

Ludewig, Alexandra, "iMovie. A Student Project with Many Side-Effects", Apple University Consortium e-Xplore 2001, Sep. 23, 2001, 12-1-12-11.

M-Audio, "Defendant's First Amended Answer", USDC-Virginia; 2:08-cv-00619, Oct. 9, 2009.

M-Audio, "Defendant's Notice Under 35 USC 282", USDC-Virginia; 2:08-cv-00619, Nov. 13, 2009.

M-Audio, , "Defendant's Responses to First Set of Interrogatories", USDC-Virginia; 2:08-cv-00619, Jun. 29, 2009.

M-Audio, , "Defendant's Second Set of Supplemental Responses to First.Set of Interrogatories", USDC Virginia 2:08-cv-00619, Aug. 13, 2009.

M-Audio, , "Defendant's Supplemental Responses to First Set of Interrogatories", USDC-Virginia; 2:08-cv-00619, Jul. 15, 2009.

M-Audio, , "Defendant's Third Set of Supplemental Responses to First Set of Interrogatories", USDC-Virginia 2:08-cv-00619, Aug. 13, 2009.

M-Audio, , "Inital Expert Report of Thaddeus Fletcher", USDC-Virginia; 2:08-cv-00619, Sep. 24, 2009.

M-Audio, , "Plaintiff N2IT Holding's Objections and Responses to Defendant M-Audio's First Request for Admissions", USDC-Virginia; 2:08-cv-00619, Nov. 2, 2009.

M-Audio,—Russell J. , "Compact Disc Playback Unit with Advanced Variable Speed Control", Discovery Disclosure Unpublished Post Graduate Project Record of Structure, Implementation & Development; Computer.Science Department, Univ. Auckland, New Zealand, Jan. 10, 1996,1-50.

McLoughlin, Catherine, "An E-Learning Solution to Creating Work-Related Skills and Comp;etencies for the Kowlede-based Community", Apple University Consortium e-Xplore 2001, Sep. 23, 2001, 14-1 to 14-13.

McLoughlin, Catherine, "Technological Tools for Visual Thinking: What Does the Research Tell Us?", Apple University Consortium e-Xplore 2001, Sep. 23, 2001,13-1 to 13-12.

McMahon, Mark, "Choreograph3D: Collaborative Innovation Through Dance and Multimedia", Apple University Consortium e-Xplore 2001, Sep. 23, 2001,15-1 to 15-8.

Moore, Ross et al., "MacQTEX: Self-Testing Quizzes, Using PDF", Apple University Consortium e-Xplore 2001, Sep. 23, 2001, 16-1 to 16-14.

N2IT, , "Digital Audio DJ Mixing Software for BeOS", New Harmony Central News, Nov. 19, 1998.

Obrien, William , "Plaintiff N2IT Holding Notice of Motion and Motion for Preliminary Injunction (Jun. 20, 2007)", USDC Central California, N2IT Holding.B.V. v. Native Instruments North America, Inc., Jun. 20, 2007.

Pagram, Jeremy , "The Apple is Ripe, But the Connection Gives Us the PIP!", Apple University Consortium e-Xplore 2001, Sep. 23, 2001, 17-1 to 17-5.

Parkinson, Alan et al., "Decoupling the WebObjects Applications from the EOModel—a case study in OO Design", Apple University Consortium e-Xplore 2001, Sep. 23, 2001, 18-1 to 18-6.

Pearce, Jon , "Motion Workshop: Tracking Motion in an On-Line Environment", Apple University Consortium e-Xplore 2001, Sep. 23, 2001, 19-1 to 19-6.

Phillips, Rob et al., "The Use of QTVR for Teaching Radiology and Diagnostic Imaging", Apple University Consortium e-Xplore 2001, Sep. 23, 2001, 20-1 to 20-8.

Radcliff, John , "Time Code a User's Guide", Oxford-Focal Press, 3rd. Ed., Jun. 1999.

Rathinavelu, A. et al., "e-Learning for Hearing Impaired Students", Apple University Consortium e-Xplore 2001, Sep. 23, 2001, 21-1 to 21-6.

Rees, Philip , "Synchronisation and SMPTE timecode (time code)", www.philrees.co.uk/articles/timecode.htm, Oct. 29, 2003.

Rowland, Gregg et al., "Exploring On-Line Learning Communities-:Supporting Physical and Health Education Professional Development Opportunities", Apple University Consortium e-Xplore 2001, Sep. 23, 2001, 22-1 to 22-7.

Ruberu, Dhammika , "Developing a Multimedia Engine in QuickTime for Java", Apple University Consortium e-Xplore 2001, Sep. 23, 2001, 23-1 to 23-9.

Segrave, Stephen , "QuickTime Multi-Track Theatricks", Apple University Consortium e-Xplore 2001, Sep. 23, 2001, 24-1 to 24-14.

Smythe, Neville , "e-Xplore 2001: a face-toface odyssey", Apple University Consortium Academic and Developers Conference, Sep. 23, 2001.

Voges, Kevin E. et al., "Computational Marketing Using an AppleSeed Cluster", Apple University Consortium e-Xplore 2001, Sep. 23, 2001, 25-1 to 25-11.

SYSTEM AND METHOD FOR CONTROLLING AUDIO EQUIPMENT

CROSS-REFERENCE TO RELATED APPLICATIONS

This application is a continuation application of U.S. patent application Ser. No. 13/351,112 entitled "System and Method for Controlling Play of Digital Audio Equipment", filed on Jan. 16, 2012, which is a continuation application of U.S. patent application Ser. No. 12/630,323, entitled "Method for Signal Processing and an Apparatus Therefore", filed on Dec. 3, 2009 and issued as U.S. Pat. No. 8,097,800 on Jan. 17, 2012, which is a continuation application of U.S. patent application Ser. No. 11/773,195, entitled "Method for Signal Processing and an Apparatus Therefore", filed on Jul. 3, 2007 which is a continuation application of U.S. patent application Ser. No. 11/355,851, entitled "Disc For Use In An Apparatus For Signal Processing, And Such An Apparatus", filed on Feb. 15, 2006, which is U.S. Pat. No. 7,238,874 issued on Jul. 3, 2007, which is a divisional application of patent application Ser. No. 10/133,846, entitled "Disc For Use In An Apparatus For Signal Processing, And Such An Apparatus", filed on Apr. 26, 2002, which is U.S. Pat. No. 7,012,184 issued on Mar. 14, 2006, which is a Continuation of International Application Number PCT/NL01/00055 filed on Jan. 26, 2001 entitled "Disc For Use In An Apparatus For Signal Processing, And Such An Apparatus", which is a continuation and claims priority to The Netherlands application number NL 1014526, entitled "Disc For Use In An Apparatus For Signal Processing, And Such An Apparatus", filed Feb. 29, 2000. The specifications and claims thereof are incorporated herein by reference.

STATEMENT REGARDING FEDERALLY SPONSORED RESEARCH OR DEVELOPMENT

Not Applicable

INTRODUCTION

The invention primarily relates to a disc for use in an apparatus for signal processing. Further, the invention relates to such an apparatus for signal processing.

BACKGROUND OF THE INVENTION

From WO 97/01168, a system is known for the digital processing of audio signals which is particularly suitable for disc jockeys and scratch artists. The speed and direction of a digital audio signal, for instance derived from a CD player, can be controlled according to this citation by the manual control of a rotational element. This rotational element is placed for instance on a turntable of a conventional record player and is being read by means of an optical sensor determining the speed and direction of rotation of the turntable. The data that are obtained thereby are being used to control the speed and direction of reproduction of the CD player. The problem associated with this known apparatus is, however, that it is hardly usable by disc jockeys and in scratch applications for the reason that from a given position of the reading head of the CD player only continuously developing relative movements are possible that depend on the control of the earlier mentioned rotational element. In the known apparatus, it is for instance not possible to make swift reproductions of different musical segments on the CD in a way that is reproducible and can be controlled satisfactorily. Also the authentic scratch sound which can be realized by means of a conventional record, cannot be obtained with the known apparatus.

SUMMARY OF THE INVENTION

With the invention it is intended to improve this and to provide a system which allows to provide a sound impression with a digital sound source which conforms to the possibilities that exist with conventional records, and with which quickly digitally recorded (musical) fragments can be located.

In a first aspect of the invention, a disc is proposed therefore which is designed for use in such an apparatus for signal processing, such that the disc during its use is placed on the turntable and is provided with a groove which can be followed by the pick-up element, and which comprises a time-code signal wherein during use of the disc the said time-code signal controls the digital audio source.

A practical embodiment of the disc is characterized in that the time-code signal is an absolute time-code signal that is comprised in the groove in a predetermined number subsequently arranged discrete steps. It is advisable to select the number of discrete steps in such way that the resolution is sufficiently high to realize the intended effect. In practice this means that the number of discrete steps may count five per second.

From a view point of cost efficiency and also to make a natural connection to the known scratching techniques with conventional records, it is desirable that the time-code signal is modulated on a carrier frequency in the audible range between 20 and 20,000 Hz. In this way, it is possible to simply use normal audio equipment for playing the disc.

In a further aspect of the invention, the apparatus for signal processing is so equipped that the pick-up element feeds a digital filter which has a phase-locked loop circuit for detecting and following a carrier frequency, and a demodulation circuit for demodulating the time-code signal that is modulated on the carrier frequency. The disc and the apparatus for signal processing can then cooperate such that the absolute time-code signal that is present on the disc, provides the control for the digital audio source.

It is further advantageous that the groove of the disc comprises a time-code signal in both the left and the right channel, which are mutually shifted in phase. In this way, a quick determination of the direction in respect of the rotation of the disc can be extracted.

Appropriately then the apparatus is equipped with a detection device for determining a phase difference between the time-code signal demodulated from the left and the right signal, respectively. In this way, the desired direction of play of the digital audio equipment can be determined already when the needle is lowered onto the disc according to the invention without noticeable delay, enhancing the impression that one is working with an entirely conventional analogue audio installation.

A suitable embodiment of the apparatus is characterized in that it comprises a digital audio buffer being under control of the time-code signal, and that the digital audio buffer is connected to a digital output filter which feeds a signal output which is selected from the group formed by a digital electric output socket, a digital optic signal output, and a D/A converter.

The scratch effect can be manufactured in such an apparatus particularly adequately when it comprises control logic being fed by the time-code signal for determining a velocity signal being a measure for the speed of change of the timecode signal, and that the digital output filter is being controlled by the said control logic.

BRIEF DESCRIPTION OF THE DRAWINGS

The invention will now be further elucidated in respect of a non-limiting embodiment explaining the disc and its use in an apparatus according to the invention in a schematic diagram.

DETAILED DESCRIPTION OF THE INVENTION

Figure 1:
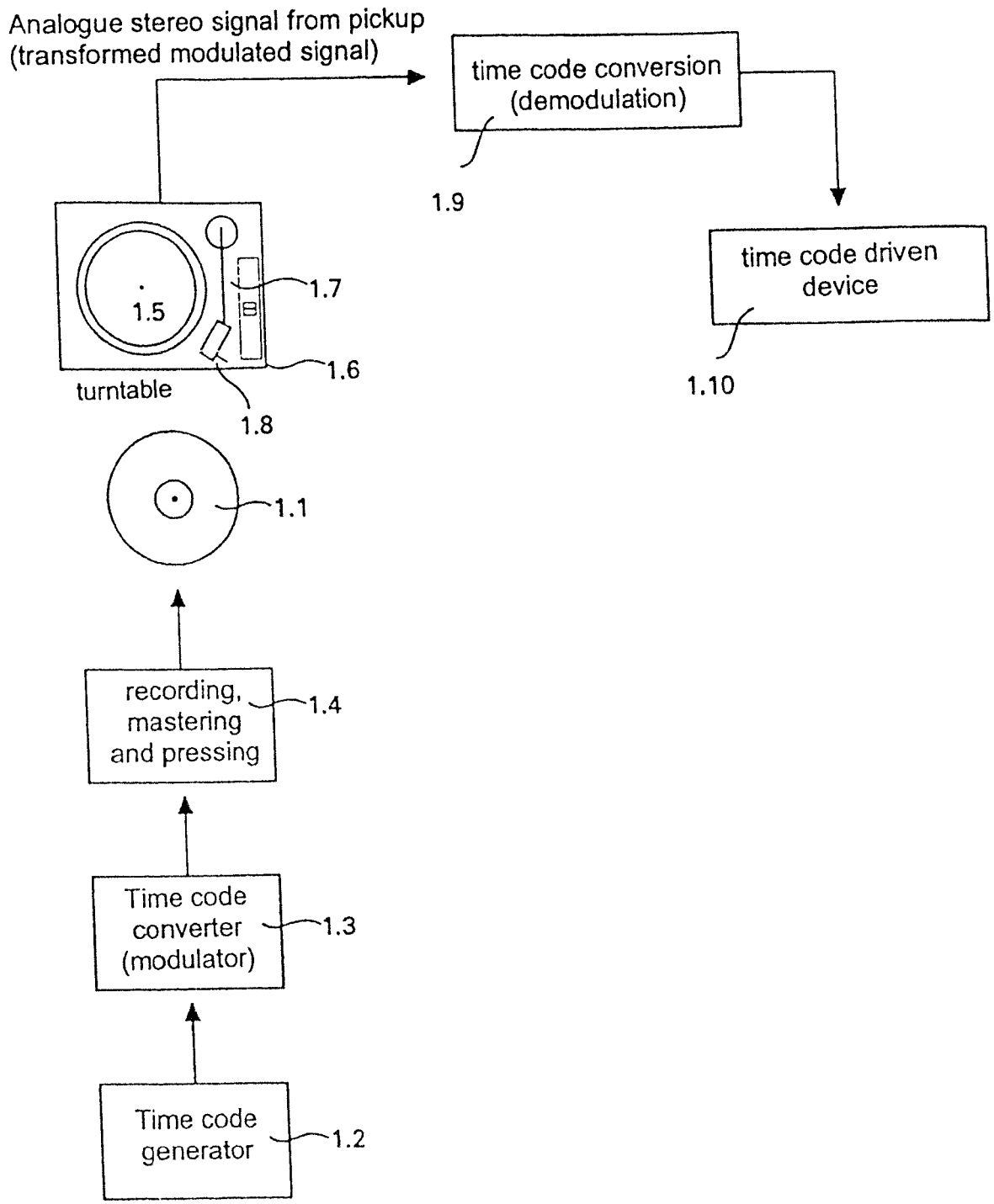
FIG. 1 shows schematically the apparatus for signal processing according to according to one embodiment of the present invention and the disc to be used thereby.

FIG. 1 shows a disc 1.1 which is manufactured according to known manufacturing techniques that have been in use for many years now in the manufacture of conventional records. The disc 1.1 is provided with an absolute time-code signal by making use of a time-code generator 1.2 controlling a modulator 1.3 which supplies a carrier frequency modulated by the time-code generator 1.2 and which is applied to the disc 1.1 as the only signal. Block 1.4 shows the conventional manufacturing method of recording, making of the master disc, and pressing the final vinyl disc 1.1. The disc 1.1 can be placed on a turntable 1.5 of a record player 1.6, which is further provided with an arm 1.7 and a pick-up element 1.8.

The pick-up element 1.8 can follow the groove in the disc 1.1 that comprises the absolute time-code signal, and the pick-up element 1.8 is connected to the apparatus part 1.9 for demodulating the carrier signal in order to provide the (digital) time-code signal, which serves for the control of the digital audio source 1.10, for instance a CD player, a DVD player, an MP3 reproduction device, or the like.

Figure 2:
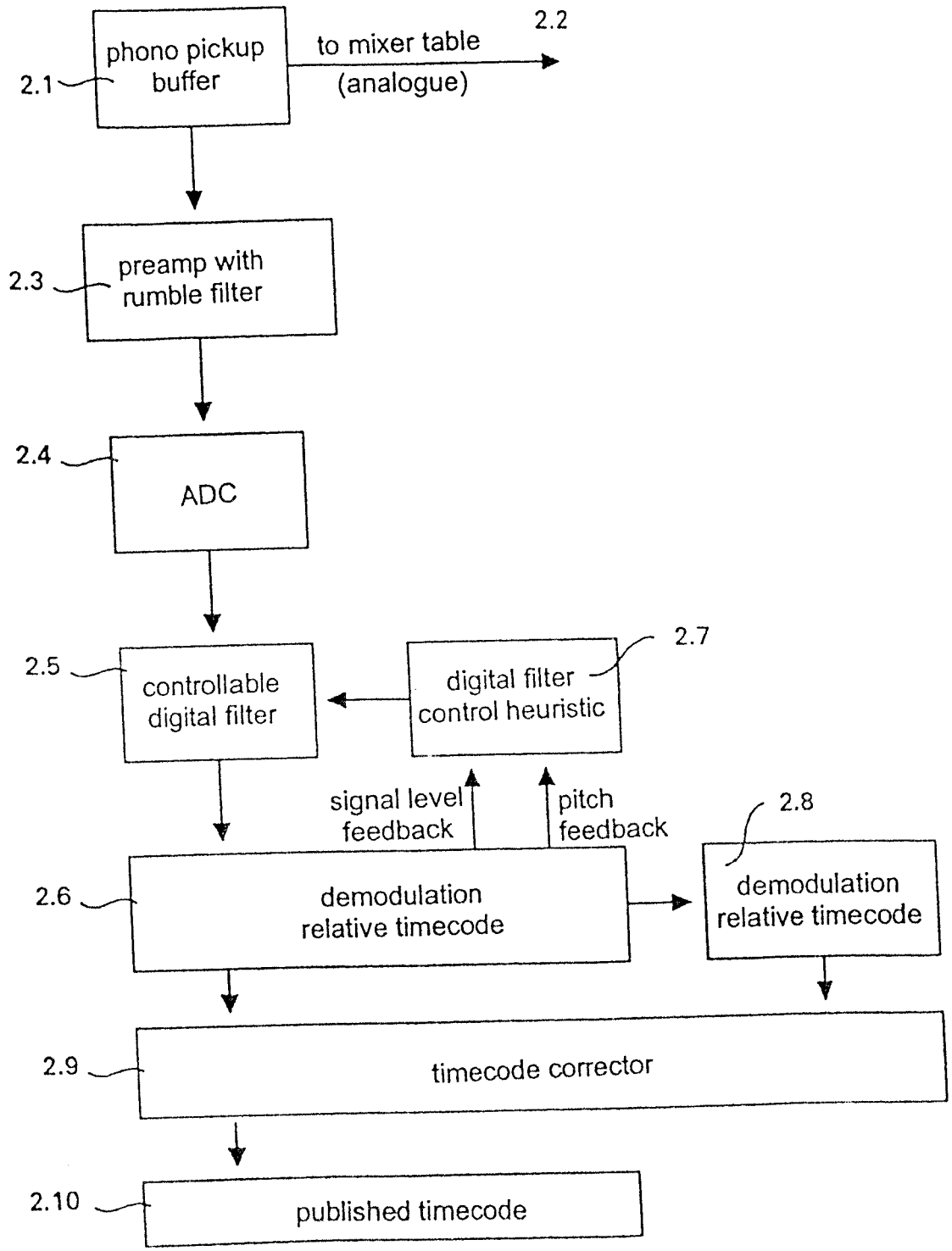
FIG. 2 show as block diagrams the signal processing applied in the apparatus according to one embodiment of the present invention.
Figure 3:
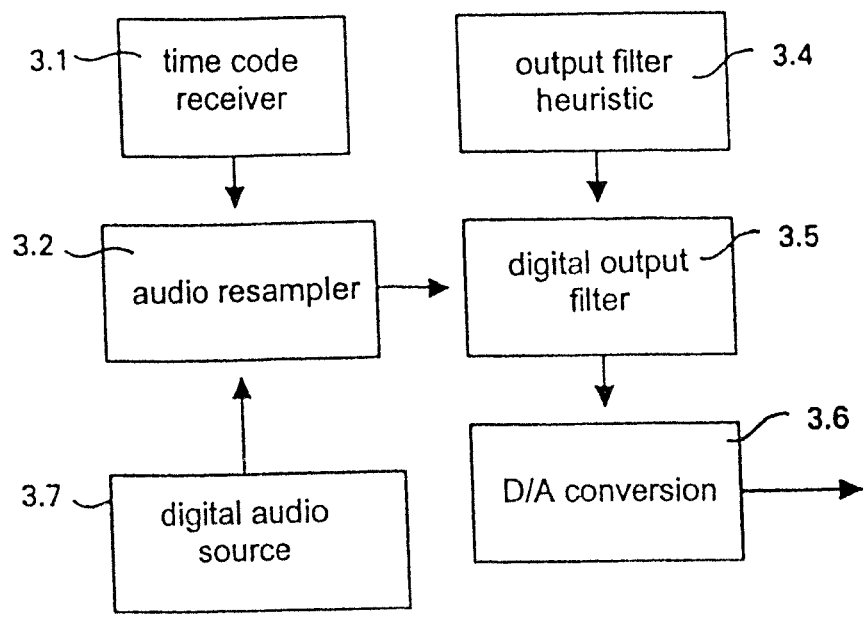
FIG. 3 then show as block diagrams the signal processing applied in the apparatus according to according to one embodiment of the present invention the invention.

The operation of the apparatus part 1.9 according to FIG. 1 will hereafter be further elucidated with reference to FIG. 2. The operation of the digital audio source 1.10 which stands under control of the time-code signal will hereafter be further elucidated with reference to FIG. 3.

Referring now first to FIG. 2, it is shown that the signal that is derived from the pick-up element 1.8 according to FIG. 1, is fed to a input buffer 2.1 from which a signal may be finally led to a mixing table 2.2 in order to provide for the situation that the turntable 1.5 according to FIG. 1 carries a conventional analogue vinyl record. The just-mentioned input buffer 2.1 feeds a preamplifier 2.3, provided with a low rejector circuit, and which feeds in turn an analogue/digital converter 2.4, for instance a 16-bit or 20-bit converter, depending on the desired resolution. The reference numerals 2.5, 2.6 and 2.7 refer to a digital filter, the operation of which depends on, inter alia, the speed of movement of the disc 1.1 according to FIG. 1 vis-a-vis the pick-up element 1.8. The apparatus part 2.7 of FIG. 2 may comprise a phase-locked loop circuit for detecting and following the carrier frequency which is provided on the disc 1.1 according to FIG. 1. In the current implementation, however, use is made of a moving average filter supplemented with detection means for detecting a stand-still of the disc 1.1. Furthermore, demodulation takes place in the circuit of apparatus part 2.6 for demodulating the time-code signal that is modulated on the carrier frequency. Although the above subject matter is shown and explained as the signal in a single channel, it is preferable according to the invention that a left and a right channel is present, and that the detection apparatus which forms part of the digital filter 2.5, 2.6, 2.7 is made in duplicate so as to allow a phase difference between the left and the right channel carrying the demodulated time-code signal to be determined. In this manner, the correct place and direction of movement of the disc 1.1 in relation to the pick-up element 1.8 according to FIG. 1 can be determined with high resolution.

The phase difference between the left and right channel is useful to extract the directional information very quickly when the pick-up element 1.8 is suddenly lowered onto the rotating disc 1.1. The absolute time-code which is determined from the carrier frequency is subsequently used together with the relative time-code, which is based on the difference between the left and the right channel, to determine an accurate time-code signal 2.10 which serves to control the digital audio source 1.10 as shown in FIG. 1. The time-code signal 2.10 of FIG. 2 is therefore read into apparatus part 3.1 (see FIG. 3) of the digital audio source, wherein same provides a direct control of a digital audio reader 3.2 reading the desired digital information from the correct place of for instance a CD disc. This digital audio information is being transferred from apparatus part 3.2 to a digital output filter 3.5 which is being controlled by control logic 3.4, and which determines from the time-code signal which is read into apparatus part 3.1, the speed of change of the time-code signal. This speed of change signal which is derived from the time-code signal, determines the parameters of the digital output filter 3.5. In a manner known to the expert, the digital output filter 3.5 can then feed a digital electric output socket, a digital optical signal output, or a D/A converter. This last provision is shown in the Figure with reference numeral 3.6.

The present invention has been described in terms of preferred embodiments, however, it will be appreciated that various modifications and improvements may be made to the described embodiments without departing from the scope of the invention.

What is claimed is:

1. A system for controlling play of audio equipment, the system comprising:
    a disc including a control signal indicative of at least speed of disc play and directionality of disc play, the disc rotating on a turntable,
    wherein the disc includes an absolute control signal, in the audible range between 20 and 20,000 Hz;
    a detection filter processing the control signal to determine a relative control signal based on a phase difference between a left channel and a right channel of the control signal,
    wherein the relative control signal indicates directionality of disc movement; and
    a digital filter utilizing the absolute control signal and the relative control signal to determine an accurate control signal serving to control play of audio equipment.

2. The system according to claim 1, wherein controlling play of the audio equipment includes controlling the speed of play of the audio equipment.

3. The system according to claim 1, wherein controlling play of the audio equipment includes controlling the direction of play of the audio equipment.

4. The system according to claim 1, wherein the place of play on the audio equipment is determined.

5. The system according to claim 1, wherein play of the audio equipment comprises the play of music.

6. The system according to claim 1, wherein the audio equipment comprises one or more of a CD player, a DVD player, and an MP3 player.

7. A method for controlling play of audio equipment, the method comprising:
rotating a disc on a player;
deriving absolute control signals from the rotating disc in the audible range between 20 and 20,000 Hz;
determining relative control signals based on a phase difference between a left channel and a right channel of the control signals; and
utilizing the absolute control signals and the relative control signals to control at least the speed of play and the direction of play of the audio equipment.

8. An apparatus for using control signals to determine play of audio equipment, the apparatus comprising:
a rotational device;
a disc, which when processed on the rotational device, provides signals to control play of audio equipment, wherein the disc comprises:
absolute control signals indicative of the speed and the directionality of disc play on the rotational device;
an analog/digital converter converting the control signals to digital control signals;
a detection filter processing the converted control signals to determine relative time-code signals by detecting a phase difference between a right channel and a left channel,
wherein the relative time-code signals are determinative of the direction of movement of the disc;
a digital filter utilizing the absolute control signals together with the relative time-code signals to determine accurate time-code signals; and
an output filter utilizing the accurate time-code signals to determine play of the audio equipment.

9. The apparatus according to claim 8, wherein the audio equipment comprises one or more of a CD player, a DVD player, and an MP3 player.

10. The apparatus according to claim 8, wherein play of the audio equipment includes producing a scratch sound effect based on the speed and the directionality of play of the disc.

11. The apparatus according to claim 8, wherein the place of play on the audio equipment is determined.

12. The system according to claim 1, wherein play of the audio equipment includes producing a scratch sound effect based on the speed and the directionality of the disc play.

13. A system for controlling play of audio equipment, the system comprising:
a disc including a control signal in the audible range between 20 and 20,000 Hz indicative of at least speed of disc play and directionality of disc play, the disc rotating on a player;
a detection filter processing the absolute control signal to determine a relative control signal based on a phase difference between a left channel and a right channel of the absolute control signal,
wherein the relative control signal indicates directionality of disc movement; and
a digital filter utilizing the absolute control signal and the relative control signal to determine an accurate control signal serving to control play of audio equipment.

14. The system according to claim 13, wherein the audio equipment comprises one or more of a CD player, a DVD player, and an MP3 device.

15. The system according to claim 13, wherein play of the audio equipment comprises at least one of controlling speed of play of the audio equipment and controlling direction of play of the audio equipment.

16. A method for controlling play of audio equipment, the method comprising:
rotating a disc on a player;
deriving absolute control signals from the rotating disc in the audible range between 20 and 20,000 Hz;
determining relative control signals based on a phase difference between a left channel and a right channel of the absolute control signals; and
utilizing the absolute control signals and the relative control signals to control at least the speed of play and the direction of play of the audio equipment.

17. The method according to claim 16, wherein the audio equipment comprises one or more of a CD player, a DVD player, and an MP3 device.

18. The method according to claim 16, wherein play of the audio equipment includes producing a scratch sound effect based on the speed and the directionality of the disc play.

19. An apparatus for using control signals to determine play of audio equipment, the apparatus comprising:
a rotational device;
a disc, which when processed on the rotational device, provides signals to control play of audio equipment, wherein the disc comprises:
absolute control signals indicative of the speed and the directionality of disc play on the rotational device;
a detection filter processing the absolute control signals to determine relative control signals by detecting a phase difference between a right channel and a left channel,
wherein the relative control signals are determinative of the direction of movement of the disc;
a digital filter utilizing the absolute control signals together with the relative control signals to determine accurate control signals; and
an output filter utilizing the accurate control signals to determine play of the audio equipment.

20. The apparatus according to claim 19, wherein the audio equipment comprises one or more of a CD player, a DVD player, and an MP3 device.

* * * * *